US011011118B2

(12) United States Patent
Lin et al.

(10) Patent No.: US 11,011,118 B2
(45) Date of Patent: May 18, 2021

(54) PIXEL-DRIVING CIRCUIT AND A COMPENSATION METHOD THEREOF, A DISPLAY PANEL, AND A DISPLAY APPARATUS

(71) Applicant: BOE TECHNOLOGY GROUP CO., LTD., Beijing (CN)

(72) Inventors: Yicheng Lin, Beijing (CN); Quanhu Li, Beijing (CN); Guang Yan, Beijing (CN); Yu Wang, Beijing (CN); Cuili Gai, Beijing (CN); Mingi Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 325 days.

(21) Appl. No.: 15/776,977

(22) PCT Filed: Nov. 30, 2017

(86) PCT No.: PCT/CN2017/113856
§ 371 (c)(1),
(2) Date: May 17, 2018

(87) PCT Pub. No.: WO2018/205565
PCT Pub. Date: Nov. 15, 2018

(65) Prior Publication Data

US 2020/0327855 A1 Oct. 15, 2020

(30) Foreign Application Priority Data

May 12, 2017 (CN) ......................... 201710335042.4

(51) Int. Cl.
*G06F 3/038* (2013.01)
*G09G 5/00* (2006.01)
*G09G 3/3283* (2016.01)

(52) U.S. Cl.
CPC ... *G09G 3/3283* (2013.01); *G09G 2300/0819* (2013.01); *G09G 2310/066* (2013.01); *G09G 2320/0233* (2013.01)

(58) Field of Classification Search
CPC ... G09G 2300/0426; G09G 2300/0814; G09G 2310/08; G09G 2320/0295;
(Continued)

(56) References Cited

U.S. PATENT DOCUMENTS

2011/0157134 A1* 6/2011 Ogura ...................... G09G 3/20
345/211
2012/0299978 A1 11/2012 Chaji
(Continued)

FOREIGN PATENT DOCUMENTS

CN 102110412 A 6/2011
CN 103077662 A 5/2013
(Continued)

OTHER PUBLICATIONS

First Office Action in the Chinese Patent Application No. 201710335042.4, dated Jul. 26, 2019; English translation attached.
(Continued)

*Primary Examiner* — Insa Sadio
(74) *Attorney, Agent, or Firm* — Intellectual Valley Law, P.C.

(57) ABSTRACT

The present application discloses a pixel-driving circuit in a display panel. The pixel-driving circuit includes a first transistor being provided with a fixed voltage, a driving transistor having a gate configured to receive the fixed voltage controlled by the first transistor and a drain coupled to a first power supply, a capacitor coupled between the gate and a source of the driving transistor, a light-emitting device coupled to the source and a second power supply, a second transistor having a drain coupled to the source of the driving
(Continued)

transistor and a source coupled to a data line, a sensing sub-circuit coupled to the data line in a first period, and a driving sub-circuit coupled to the data line in a second period. The sensing sub-circuit and the driving sub-circuit are configured to connect to the data line in a time-divisional manner respectively for sensing and compensating the pixel-driving circuit.

20 Claims, 4 Drawing Sheets

(58) Field of Classification Search
CPC .. G09G 2320/043; G09G 3/30; G09G 3/3208; G09G 3/3233; G09G 3/3266
See application file for complete search history.

(56) References Cited

U.S. PATENT DOCUMENTS

| | | | | |
|---|---|---|---|---|
| 2013/0050292 | A1 | 2/2013 | Mizukoshi | |
| 2013/0083001 | A1 | 4/2013 | Jeong | |
| 2013/0147694 | A1 | 6/2013 | Kim et al. | |
| 2013/0162617 | A1 | 6/2013 | Yoon et al. | |
| 2015/0062192 | A1 | 3/2015 | Kim et al. | |
| 2016/0307498 | A1* | 10/2016 | Chaji | G09G 3/3291 |
| 2017/0061877 | A1 | 3/2017 | Lee | |
| 2017/0162121 | A1 | 6/2017 | Yang et al. | |
| 2017/0162125 | A1 | 6/2017 | Liang | |

FOREIGN PATENT DOCUMENTS

| | | | |
|---|---|---|---|
| CN | 103562989 | A | 2/2014 |
| CN | 104882100 | A | 9/2015 |
| CN | 105047137 | A | 11/2015 |
| CN | 105489159 | A | 4/2016 |
| CN | 105702206 | A | 6/2016 |
| CN | 105957473 | A | 9/2016 |
| CN | 206657641 | U | 11/2017 |
| WO | 2009087746 | A1 | 7/2009 |
| WO | 2014208459 | A1 | 12/2014 |
| WO | 2016177001 | A1 | 11/2016 |

OTHER PUBLICATIONS

International Search Report & Written Opinion dated Feb. 24, 2018, regarding PCT/CN2017/113856.
First Office Action in the Indian Patent Application No. 201827019723, dated Jul. 8, 2020; English translation attached.
The Extended European Search Report in the European Patent Application No. 17870647.9, dated Nov. 16, 2020.
First Office Action in the Japanese Patent Application No. 2018529116, dated Mar. 15, 2021; English translation attached.

* cited by examiner

PIXEL-DRIVING CIRCUIT AND A COMPENSATION METHOD THEREOF, A DISPLAY PANEL, AND A DISPLAY APPARATUS

CROSS-REFERENCE TO RELATED APPLICATION

This application is a national stage application under 35 U.S.C. § 371 of International Application No. PCT/CN2017/113856, filed Nov. 30, 2017, which claims priority to Chinese Patent Application No. 201710335042.4, filed May 12, 2017, the contents of which are incorporated by reference in the entirety.

TECHNICAL FIELD

The present invention relates to display technology, more particularly, to a pixel-driving circuit and a compensation method thereof, a display panel, and a display apparatus having the same.

BACKGROUND

Organic light-emitting diode (OLED) display has been widely implemented in many applications. OLED display usually has an issue of non-uniformity in emitted light from individual diode and needs certain compensation to ensure display quality. Typical compensation scheme needs to sense electrical properties of driving transistor in each pixel-driving circuit from a sense line and generate a compensated data signal sent via a data line back to the driving transistor. The sense lines and the data lines are separately laid in the display panel, reducing pixel aperture rate, increasing number of IC layout, and driving up the cost of display panel manufacture.

SUMMARY

In an aspect, the present disclosure provides a pixel-driving circuit in a display panel. The pixel-driving circuit includes a first driving sub-circuit configured to receive a data signal from a data line coupled to a source of a driving transistor for driving a light-emitting device. Additionally, the pixel-driving circuit includes a sensing sub-circuit coupled to the data line in a first period. Furthermore, the pixel-driving circuit includes a second driving sub-circuit coupled to the data line in a second period. The sensing sub-circuit is configured to sense a first electrical parameter associated with the driving transistor and a second electrical parameter associated with the light-emitting device in the first period. The second driving sub-circuit is configured to generate a compensated data signal based on compensation of a raw data signal using the first electrical parameter and the second electrical parameter and provide the compensated data signal to via the data line to the driving transistor in the second period.

Optionally, the first driving sub-circuit includes a first transistor coupled to an input port being provided with a fixed voltage. The driving transistor includes a gate configured to receive the fixed voltage controlled by the first transistor and a dram coupled to a first power supply. Additionally, the first driving sub-circuit includes a capacitor coupled between the gate and a source of the driving transistor. Furthermore, the first driving sub-circuit includes the light-emitting device having a first terminal coupled to the source and a second terminal coupled to a second power supply. Moreover, the first driving sub-circuit includes a second transistor having a drain coupled to the source of the driving transistor and a source coupled to the data line.

Optionally, the fixed voltage is a common voltage signal for each pixel-driving circuit in the display panel.

Optionally, the sensing sub-circuit and the second driving sub-circuit are integrated into a single source-driving chip in the display panel.

Optionally, the pixel-driving circuit further includes a switch having a first terminal connected to the data line, a second terminal connected to the sensing sub-circuit, and a third terminal connected to the second driving sub-circuit. The switch is configured to connect the first terminal to the second terminal in the first period and connect the first terminal to the third terminal in the second period.

Optionally, the first transistor includes a gate coupled to a first control port, a first terminal coupled to the input port configured to receive the fixed voltage, and a second terminal coupled to the gate of the driving transistor. The second transistor includes a gate coupled to a second control port, a first terminal coupled to the data line, and a second terminal coupled to the source of the driving transistor.

Optionally, the light-emitting device comprises an organic light-emitting diode.

Optionally, the sensing sub-circuit is configured to sense a first electrical parameter associated with the driving transistor in a transistor-sensing period of the first period by sensing a voltage corresponding to a current flowing through the driving transistor. The first electrical parameter includes information related to threshold voltage drift and electron mobility drift of the driving transistor.

Optionally, the sensing sub-circuit is configured to sense a second electrical parameter associated with the light-emitting device in a LED-sensing period of the first period by sensing a current flowing through the light-emitting device. The second electrical parameter includes information related to emission efficiency and brightness decay percentage of the light-emitting device.

Optionally, the transistor-sensing period includes to a first sub-period during which the data line receives a testing voltage from a test input port and the driving transistor is in conduction state and the sensing sub-circuit senses the testing voltage at the source of the driving transistor. Further, the transistor-sensing period includes a second sub-period during which the test input port is floated and the data line is connected to the source of the driving transistor which is charged to a sensing voltage induced by the current flowing through the driving transistor over a fixed duration of time and the sensing sub-circuit senses the sensing voltage in the data line for deducing the first electrical parameter. The transistor-sensing period additionally includes a third sub-period during which the data line is reset to the testing voltage.

Optionally, the LED-sensing period includes a fourth sub-period during which the data line receives a testing voltage from a test input port and the light-emitting device is in conduction state and the sensing sub-circuit senses the current flowing through the light-emitting device in the data line for deducing the second electrical. Additionally, the LED-sensing period includes a fifth sub-period during which the data line is reset to the testing voltage.

Optionally, the second driving sub-circuit is part of a source-driving chip configured to receive the raw data signal from a data source and provide the compensated data signal based on a compensation of the raw data signal to the data line and further to the source of the driving transistor through the second transistor to generate a driving current through the light-emitting device in the second period.

Optionally, the second period includes a sixth sub-period during which the first transistor and the second transistor are in conduction state, the fixed voltage is applied to the gate of the driving transistor to make it in conduction state, the compensated data signal is applied to the source of the driving transistor. This makes a gate-to-source potential difference equal to the fixed voltage minus the compensated data signal. Additionally, the second period includes a seventh sub-period during which the first transistor and the second transistor are in non-conduction state, the source of the driving transistor is charged to a voltage provided at the second power supply plus a potential difference induced by the driving current flowing through the light-emitting device.

In another aspect, the present disclosure provides a method for compensating a data signal for driving the pixel-driving circuit described herein. The method includes using the sensing sub-circuit through the data line to sense a first electrical parameter associated with the driving transistor in a transistor-sensing period. Additionally, the method includes using the sensing sub-circuit through the data line to sense a second electrical parameter associated with the light-emitting device in a LED-sensing period. Furthermore, the method includes, in a display-driving period, applying a first control signal to the first control line to make the first transistor in a conduction state to apply the fixed voltage to the gate of the driving transistor, and using the second driving sub-circuit to provide a compensated data signal based on the first electrical parameter and the second electrical parameter to via the data line coupled to the source of the driving transistor, applying a second control signal to the second control line to make the second transistor in a conduction state to apply the compensated data signal to the source of the driving transistor to generate a driving current flowing through the OLED to emit light.

Optionally, the method of using the sensing sub-circuit through the data line to sense a first electrical parameter includes applying the first control signal to the first control line to make the first transistor in a conduction state to apply the fixed voltage to the gate of the driving transistor to make the driving transistor in a conduction state. The method of using the sensing sub-circuit further includes applying a testing voltage from a test input port, and applying a second control signal to the second control line to make the second transistor in a conduction state to apply the testing voltage to the source of the driving transistor. Further, the method of using the sensing sub-circuit includes turning off the first transistor by the first control signal and cutting off the testing voltage from the test input port. Furthermore, the method of using the sensing sub-circuit includes charging the source of the driving transistor from the first power supply. Moreover, the the method of using the sensing sub-circuit includes sensing a voltage value in the data line corresponding to a potential level at the source of the driving transistor being charged for a certain duration of time.

Optionally, the voltage value in the data line is processed in an external IC chip to deduce the first electrical parameter associated with the driving transistor including information related to threshold voltage drift and electron mobility drift of the driving transistor. The first electrical parameter is used for generating the compensated data signal.

Optionally, the method of using the sensing sub-circuit through the data line to sense a second electrical parameter includes turning off the first transistor by the first control signal and applying the testing voltage to the data line. Further, the method of using the sensing sub-circuit includes applying the second control signal to the second control line to control the second transistor in a conduction state to apply the testing voltage to the first terminal of the light-emitting device. Furthermore, the method of using the sensing sub-circuit includes sensing a current value in the data line flowing through the light-emitting device.

Optionally, the current value is processed by an external IC chip to deduce the second electrical parameter associated with the light-emitting device including information related to emission efficiency and brightness decay percentage of the light-emitting device. The second electrical parameter is used for generating the compensated data signal.

In yet another aspect, the present disclosure provides a display panel including a plurality of pixel-driving circuits each of which includes a first driving sub-circuit alternately coupled to a sensing sub-circuit and a second driving sub-circuit via a data line controlled by a switch. Each first driving sub-circuit includes a first transistor coupled to an input port being provided with a fixed voltage and a driving transistor having a gate configured to receive the fixed voltage controlled by the first transistor and a drain coupled to a first power supply. Each first driving sub-circuit further includes a capacitor coupled between the gate and a source of the driving transistor and a light-emitting device having a first terminal coupled to the source and a second terminal coupled to a second power supply. Additionally, each first driving sub-circuit includes a second transistor having a drain coupled to the source of the driving transistor and a source coupled to the data line. The data line is connected to the sensing sub-circuit and is disconnected to the second driving sub-circuit in a first period during which the sensing sub-circuit is configured to sense a first electrical parameter associated with the driving transistor and a second electrical parameter associated with the light-emitting device. The data line is disconnected to the sensing sub-circuit and is connected to the second driving sub-circuit in a second period during which the second driving sub-circuit is configured to generate a compensated data signal based on compensation of a raw data signal using the first electrical parameter and the second electrical parameter and provide the compensated data signal to the data line. The compensated data signal is able to be applied to the source of the driving transistor controlled by the second transistor.

Optionally, the light-emitting device is an organic light-emitting diode, and the sensing sub-circuit and the second driving sub-circuit associated with each pixel-driving circuit are integrated in a single source-driving chip coupled to the data line in the display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Accordingly, the present disclosure provides, inter alia, a pixel-driving circuit, a display panel and a display apparatus having the same, and a method of driving the pixel-driving circuit thereof that substantially obviate one or more of the problems due to limitations and disadvantages of the related art.

Figure 1:
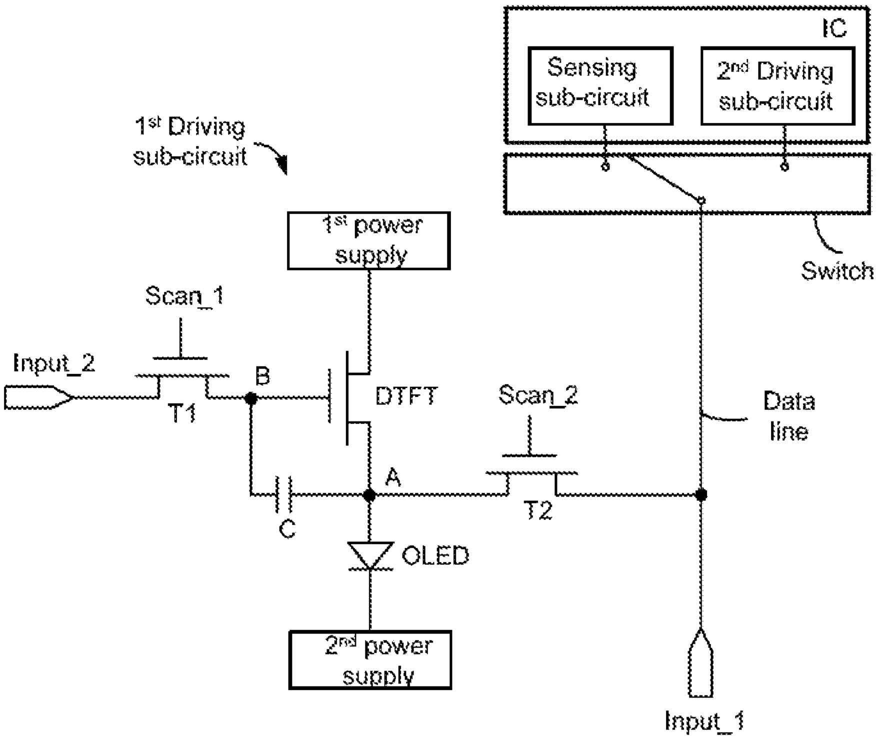
FIG. 1 is a simplified diagram of a pixel-driving circuit according to an embodiment of the present disclosure.

In one aspect, the present disclosure provides a pixel-driving circuit as shown in FIG. 1. The pixel-driving circuit is disposed to be associated with a sub-pixel via at least a data line in a display panel. Referring to FIG. 1, the pixel-driving circuit includes a first driving sub-circuit configured to receive a data signal from the data line coupled to a source of a driving transistor for driving a light-emitting device. The pixel-driving circuit further includes a sensing sub-circuit coupled to the data line in a first period and a second driving sub-circuit coupled to the data line in a second period. The sensing sub-circuit is configured to sense a first electrical parameter associated with the driving transistor and a second electrical parameter associated with the light-emitting device in the first period. The second driving sub-circuit is configured to generate a compensated data signal based on compensation of a raw data signal using the first electrical parameter and the second electrical parameter and provide the compensated data signal to via the data line to the driving transistor in the second period.

In this circuit of FIG. 1, all transistors used in the embodiments of the present invention may be formed as same type of thin film transistors or field effect transistors or other characteristics. Since a source terminal and a drain terminal of the transistor are symmetrical and indistinguishable, in the specification, one of the source terminal and the drain terminal of the transistor is referred to the first terminal, the other is then referred to the second terminal, and the gate is interchangeably referred to the control terminal. In addition, the transistor type includes N-type and P-type according to its characteristics. In the embodiments disclosed herein, the N-type transistor is used. The first terminal of an N-type transistor is the source and the second terminal is the drain. When the gate is applied with a high voltage level, the transistor is in conduction state between the drain and source. The opposite is true if the transistor is a P-type transistor. Additionally, in the embodiments described herein, the light-emitting device is current-driven emitting device. In particular, the light-emitting device is an organic light-emitting diode (OLED).

Referring to FIG. 1, in an embodiment the first driving sub-circuit includes a driving transistor DTFT, a first transistor T1, a capacitor C, a second transistor T2, and an OLED coupled to the driving transistor DTFT via node A which is further coupled to the data line via the second transistor T2. Optionally, the first driving sub-circuit can be configured differently with different number of transistors and capacitors to achieve substantially a same function of driving the OLED to emit light based on a data signal supplied to the sensing sub-circuit and the second driving sub-circuit are coupled with the second transistor T2 via the data line associated with the pixel-driving circuit. The first transistor T1 has a control terminal or gate coupled to a first control line Scan_1. The first transistor T1 has a first terminal coupled to an input port Input_2 configured to be provided with a fixed voltage. The first transistor T1 has a second terminal coupled to a control terminal or gate of the driving transistor DTFT. In the embodiment, the first transistor T1 is a switch transistor configured to connect its first terminal to its second terminal or disconnect them from each other under the control of a first control signal provided from the first control line Scan_1.

Referring to FIG. 1, the driving transistor DTFT has the gate (i.e., node B) coupled to a first terminal of the capacitor C. The driving transistor DTFT also has a first terminal coupled to the first power supply and a second terminal (i.e., node A) coupled to a first terminal of the OLED. The first driving sub-circuit is configured to use a gate voltage to control the driving transistor DTFT to generate a driving current from the first terminal to the second terminal to drive the OLED to emit light. The capacitor C has a first terminal coupled to the gate (node B) and a second terminal coupled to the second terminal (node A) of the driving transistor DTFT.

Referring to FIG. 1 again, the second transistor T2 has a control terminal or gate coupled to a second control line Scan_2. The second transistor T2 also has a first terminal coupled to the data line associated with the pixel-driving circuit and a second terminal coupled to the second terminal of the driving transistor DTFT and the first terminal of the OLED. In the embodiment, the second transistor T2 is a switch transistor configured to connect its first terminal to its second terminal or disconnect them from each other under the control of a second control signal provided from the second control line Scan_2.

In an embodiment, the data line is coupled to a test input port Input_1. In some embodiments, the data line is alternatively in time connected to the sensing sub-circuit in a first period and to the second driving sub-circuit in a second period. The first period includes a transistor-sensing period during which the sensing sub-circuit is configured to sense a first electrical parameter associated with the driving transistor DTFT and a LED-sensing period during which the sensing sub-circuit is configured to sense a second electrical parameter associated with the OLED. Optionally, the sensing sub-circuit is provided as an integrated chip with various micro-components configured to receive a signal from the data line, to measure the value of the signal, and to calculate corresponding electrical properties the subject device that directly connects the data line and contributes the signal based on pre-stored information and programs. Optionally, the integrated chip for the sensing sub-circuit is disposed in the display panel.

For example, in the transistor-sensing period, the sensing sub-circuit is connected through the data line directly to the driving transistor (with the second transistor being set in a conduction state), thus the electrical properties characterizing the driving transistor can be determined. In the LED-sensing period, the sensing sub-circuit is connected through the data line directly to the OLED (with the second transistor being set in a conduction state), thus the electrical properties characterizing the OLED can be determined. These electrical properties sensed by the sensing sub-circuit can be used to determine a compensation scheme for properly compensate a data signal to be supplied via the data line to the first driving sub-circuit for reducing non-uniformity issue of light-emission of the OLEDs on the display panel. Optionally, the compensation scheme includes at least a first electrical parameter for compensating drifts associated with the driving transistor and a second electrical parameter for compensating drifts associated with the OLED. In an embodiment, the second driving sub-circuit is configured to generate a compensated data signal based on compensation of a raw data signal using the first electrical parameter and the second electrical parameter and provide the compensated data signal to the data line. Herein in the present embodiment, the data signal (or the compensated data signal) is provided to the second terminal of the driving transistor DTFT of the first driving sub-circuit for generating a driving current accordingly. Optionally, the second driving sub-circuit is provided as an integrated source-driving chip disposed in the display panel.

Referring to FIG. 1, the data line for providing a driving data signal for the first driving sub-circuit and the sense line for monitoring current signals flowing through either the driving transistor or the OLED are operated in a same physical conduction line with a time-divisional setup. Optionally, the pixel-driving circuit of the present disclosure includes a switch having a first terminal connected to the data line, a second terminal connected to the sensing sub-circuit, and a third terminal connected to the driving sub-circuit. The switch is configured to connect the first terminal to the second terminal in the first period and connect the first terminal to the third terminal in the second period alternate to the first period. Therefore, the pixel-driving circuit of the present disclosure only needs just one data line which is shared as a sense line and no separate sense line is needed. This pixel circuitry structure substantially reduces number of conductor lines in the display panel and enhances the pixel aperture rate.

Optionally, the fixed voltage provided at the input port Input_2 is a common voltage signal supplied by a common voltage line pre-laid for the whole display panel. In other words, the first terminal of the first transistor T1 of each pixel-driving circuit in the display panel is connected to the common voltage line. Then there is no need to set an extra fixed voltage line for the pixel-driving circuit. In the embodiment, the first power supply provides a general operation voltage Vdd. The second power supply provides a ground voltage Vss. The common voltage line corresponds to a voltage Vcom. Optionally, Vcom=8V.

In some embodiments, the pixel-driving circuit of the present disclosure is configured to operate in three periods: a transistor-sensing period, a LED-sensing period, and a display-driving period.

Figure 2:
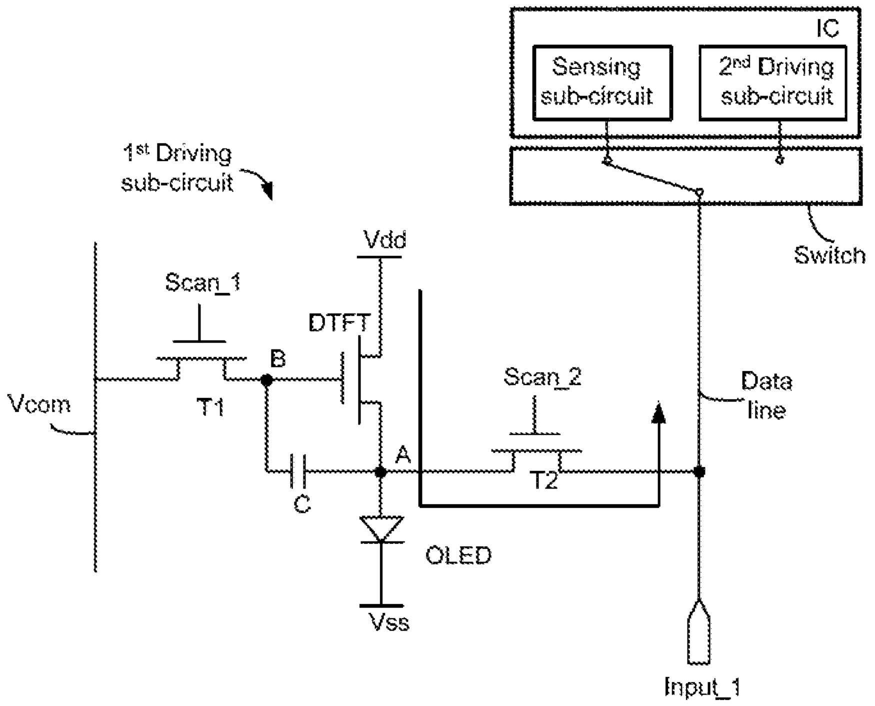
FIG. 2 is a schematic diagram of the pixel-driving circuit operated in a transistor-sensing period according to an embodiment of the present disclosure.
Figure 3:
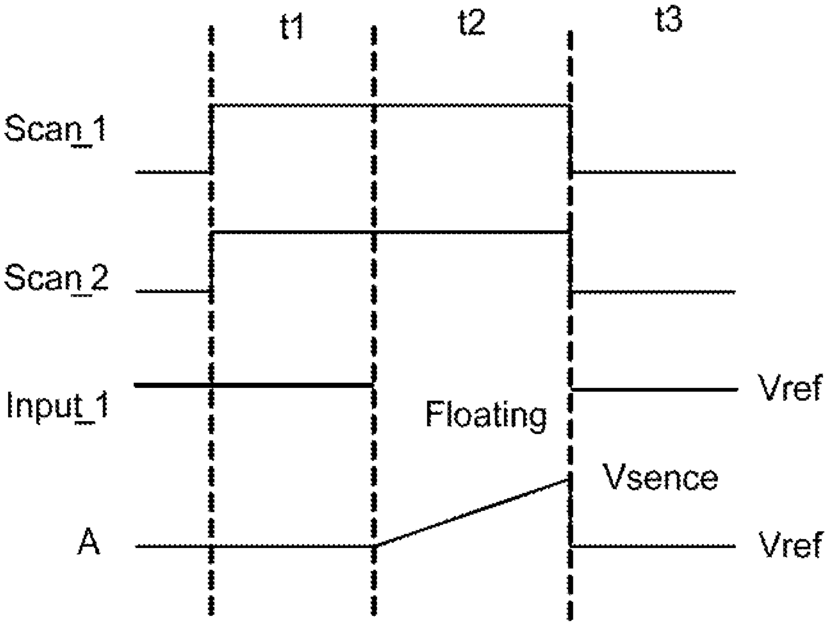
FIG. 3 is a timing diagram of operating the pixel-driving circuit in a transistor-sensing period according to an embodiment of the present disclosure.

FIG. 2 is a schematic diagram of a pixel-driving circuit operated in the transistor-sensing period according to an embodiment of the present disclosure. FIG. 3 is a timing diagram of the pixel-driving circuit of FIG. 2 in the transistor-sensing period. Referring to FIG. 2 and FIG. 3, during the transistor-sensing period, the switch is configured to connect its first terminal and its second terminal to make the sensing sub-circuit to connect to the data line. In a specific embodiment, the transistor-sensing period includes a first sub-period, a second sub-period, and a third sub-period, wherein the second sub-period has a pre-fixed time duration.

In the first sub-period, t1, the first control line Scan_1 provides a first control signal at a high voltage level, the second control line Scan_2 provides a second control signal also at the high voltage level. The testing signal is provided from the test input port Input_1 to the data line. The testing signal corresponds to a voltage Vref.

Since the first control signal is at the high voltage level, the first transistor T1 is turned into a conduction state. The common voltage Vcom is passed via the first transistor T1 to the control terminal of the driving transistor DTFT. Vcom is also a high voltage level, turning the driving transistor DTFT in a conduction state. Node B thus has a voltage level of Vcom. Since the second control signal is at the high voltage level, the second transistor T2 is turned into a conduction state. Thus, the testing signal can be passed from the data line through the second transistor T2 to be applied to node A, i.e., node A has a voltage level of Vref. At this time, the sensing sub-circuit is able to sense a first current signal in the data line corresponding to the voltage Vref. Optionally, the first current signal and the corresponding Vref are saved in a digital format in a storage micro-component of the integrated chip.

In the second sub-period, t2, the first control signal remains at the high voltage level and the second control signal also at the high voltage level. The first transistor T1 and the second transistor 2 are kept at the conduction state. The test input port Input_1 is in a floating state. A current flowing from the first terminal to the second terminal (node A) through the driving transistor DTFT will keep charging the node A in the second sub-period up to the pre-fixed time duration to reach a voltage level of Vsense. Accordingly, at this time the sensing sub-circuit is able to sense a second current signal in the data line corresponding to the voltage Vsense. Optionally, the second current signal and the corresponding Vsense are also saved in a digital format in a storage micro-component of the integrated chip.

Optionally, the integrated chip for the sensing sub-circuit includes a microprocessor component capable of comparing the Vsense to a reference voltage value pre-stored in the storage component therein and calculating a first electrical parameter characterizing the electrical properties of the driving transistor DTFT. The pre-stored reference voltage value corresponds to a voltage value at node A measured by the sensing sub-circuit in the second sub-period for the driving transistor DTFT under a condition that there is no drifts in electron mobility and threshold voltage. By comparing Vsense obtained at the current time with this reference voltage, the drifts of the electron mobility and threshold voltage or related electrical properties of the driving transistor DTFT can be deduced. A representative first electrical parameter can be determined for compensating the drift of the driving transistor depending on a specific compensation scheme or algorithm.

In the third sub-period, t3, the first control signal and the second control signal are set at a low voltage level, causing both the first transistor T1 and the second transistor T2 to be in non-conduction state. The control terminal of the driving transistor DTFT, which also is the node B, and the node A respectively are discharged through the first transistor T1 and the second transistor T2. The voltage levels at both node A and node B are reducing, turning the driving transistor DTFT to be a non-conduction state at a certain time. The test input port Input_1 provides a testing signal Vref to the data line to reset the data line.

Figure 4:
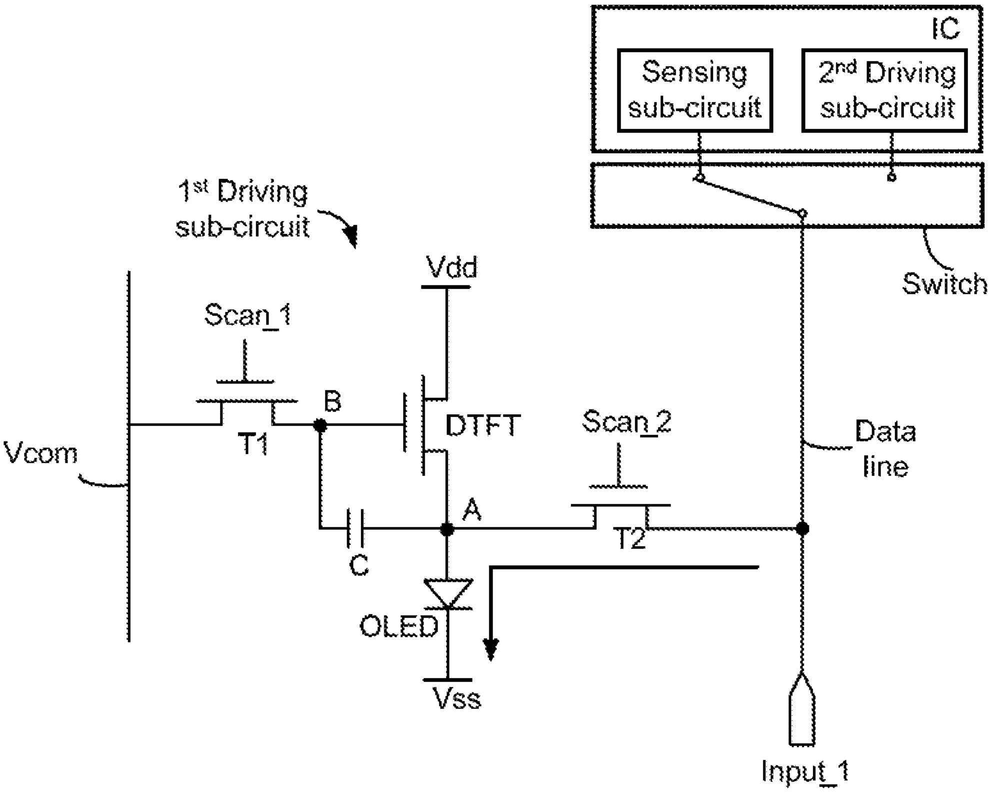
FIG. 4 is a schematic diagram of the pixel-driving circuit operated in a LED-sensing period according to an embodiment of the present disclosure.
Figure 5:
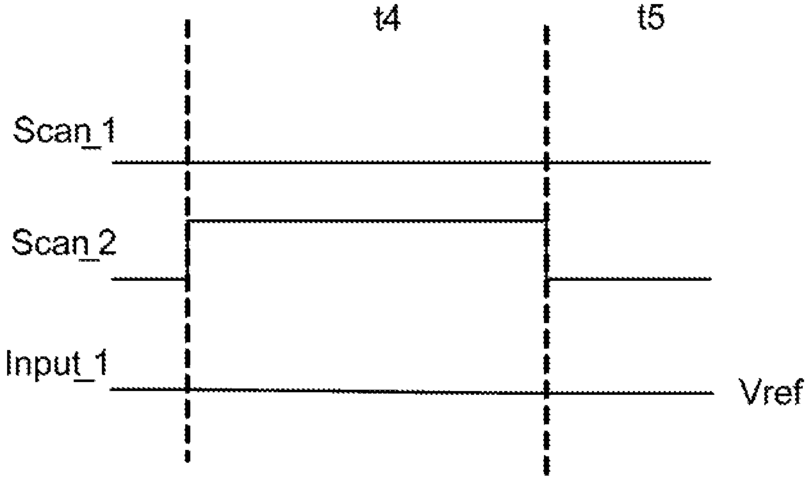
FIG. 5 is a timing diagram of operating the pixel-driving circuit in a LED-sensing period according to an embodiment of the present disclosure.
Figure 6:
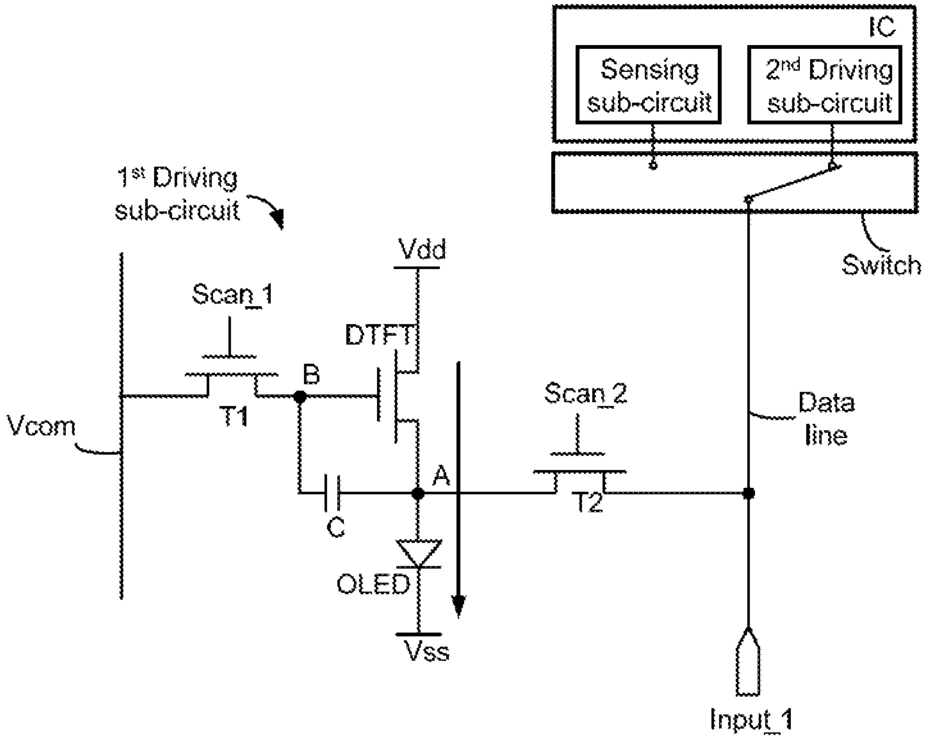
FIG. 6 is a schematic diagram of the pixel-driving circuit operated in a display-driving period according to an embodiment of the present disclosure.

FIG. 4 is a schematic diagram of a pixel-driving circuit operated in the LED-sensing period according to an embodiment of the present disclosure. FIG. 5 is a timing diagram of the pixel-driving circuit of FIG. 4 in the LED-sensing period. Referring to FIG. 6 and FIG. 5, in the LED-sensing period, the switch is operated to connect the first terminal to the second terminal to connect the sensing sub-circuit to the data line. In the embodiment, the LED-sensing period includes a fourth sub-period t4 and a fifth sub-period t5.

In the fourth sub-period t4, the first control signal inputted from the first control line Scan_1 is set to a low voltage level and the second control signal inputted from the second control line Scan_2 is set to a high voltage level. The test input port Input_1 provides a testing signal corresponding to a voltage level Vref to the data line.

As the first control signal is set at the low voltage level, the first transistor T1 is in a non-conduction state, making the driving transistor DTFT also in a non-conduction state. While since the second control signal is set at the high voltage level, the second transistor T2 is in a conduction state, allowing the testing signal to be passed from the data line through the second transistor T2 to the node A. Node A now has a voltage level Vref which is at the first terminal of the OLED and is higher than the ground voltage Vss provided at the second power supply at the second terminal of the OLED. Because of the voltage difference across the OLED, a current is generated flowing from the data line through the OLED. The sensing sub-circuit at this time is able to sense the current Isense in the data line. Optionally, the sensed current Isense can be saved in a digital format in a storage component of the integrated chip for the sensing sub-circuit.

The sensing sub-circuit compares the sensed current Isense with a reference current value pre-stored in the integrated chip to calculate relevant electrical properties of the light emitting device OLED. The pre-stored reference current value is measured by the sensing sub-circuit in the fourth sub-period under a condition that the OLED is operated with a standard emission efficiency. By comparing the value of Isense to the reference current value, electrical properties such as the emission efficiency and emission efficiency decay percentage of the OLED at the current time can be deduced. Accordingly, a representative second electrical parameter can be determined for compensating the drift of the OLED depending on a specific compensation scheme or algorithm.

Optionally, both Vsense and Isense can be used to determine the first electrical parameter and the second electrical parameter for the pixel-driving circuit compensation. Optionally, only one of the first parameter and the second parameter is used for make the compensation, i.e., only making compensation to the drift of the transistor or only making compensation to the drift of the OLED.

In the fifth sub-period t5, the sensing sub-circuit is in a reset mode with the control voltage settings being the same as those in the third sub-period t3 described above.

In an embodiment, the pixel-driving circuit is configured to operate in a display-driving period after the first electrical parameter and the second electrical parameter is determined depending on a compensation scheme. In the display-driving period, the second driving sub-circuit is operated to provide a compensation to a raw data signal received from a data source and generate a compensated data signal to the data line.

Figure 7:
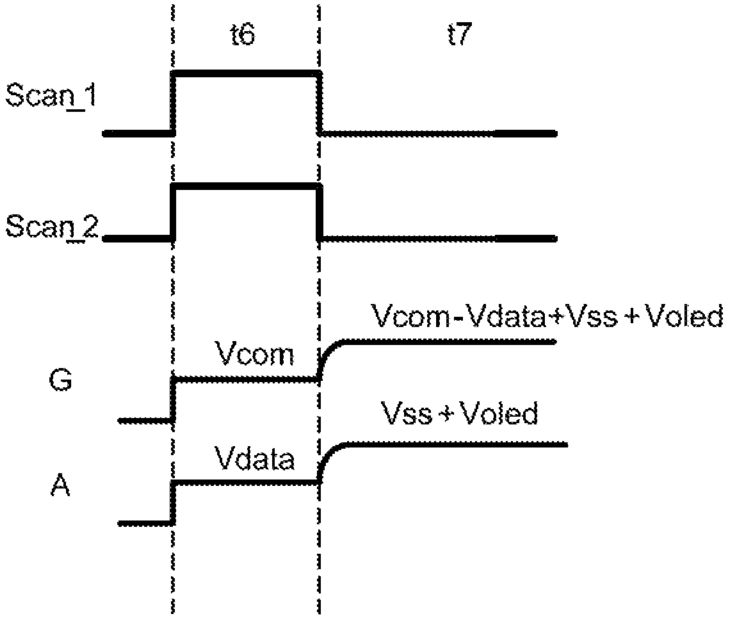
FIG. 7 is a timing diagram of operating the pixel-driving circuit in a display-driving period according to an embodiment of the present disclosure.

FIG. 6 is a schematic diagram of a pixel-driving circuit operated in the display-driving period according to an embodiment of the present disclosure. FIG. 7 is a timing diagram of the pixel-driving circuit of FIG. 6 in the display-driving period. Referring to FIG. 6 and FIG. 7, in the display-driving period, the switch is operated to connect its first terminal to its third terminal to connect the second driving sub-circuit to the data line. In the embodiment, the display-driving period includes a sixth sub-period t6 and a seventh sub-period t7.

In the sixth sub-period t6, the first control signal from the first control line Scan_1 is set at the high voltage level and the second control signal from the second control line Scan_2 is also set at the high voltage level. The test input port Input_1 is in a floating state. The first transistor T1 is in a conduction state due to the high voltage level of the first control signal so that the common voltage Vcom is able to be passed to the control terminal of the driving transistor DTFT. The second transistor T2 is in a conduction state due to the high voltage level of the second control signal so that the compensated data signal (corresponding to a voltage Vdata) provided by the second driving sub-circuit through the data line can pass through the second transistor T2 to apply to the second terminal of the driving transistor DTFT. At this time, the capacitor C stores a voltage difference of Vcom−Vdata. Since the driving transistor DTFT is in conduction state, the gate-to-source voltage Vgs of the driving transistor DT will also be Vcom-Vdata.

In the seventh sub-period t7, the first control signal is set to the low voltage level and the second control signal is also set to the low voltage level, making both the first transistor T1 and the second transistor T2 in non-conduction state. The current flowing through the driving transistor DTFT is charging the node A to have its potential level to reach Vss+Voled, where Vss is the grounded voltage level of the second power supply and Voled is a voltage drop as a current flows through the OLED. Under a bootstrap effect of the capacitor C, the potential level at the control terminal of the driving transistor DTFT will be pulled up to Vcom−Vdata+Vss+Voled.

The driving transistor DTFT is operating in a saturate state and a driving current under this condition can be expressed as:

$$\begin{aligned} I &= K\times(Vgs-Vth)^2 \\ &= K\times(Vcom-Vdata-Vth)^2 \end{aligned}$$

where I is the driving current outputted by the driving transistor DTFT, K is a constant depended on electron mobility in the active layer and capacitance per unit area of the gate insulation layer as well as channel length of the driving transistor structure, and Vth is a current value of the threshold voltage of the driving transistor DTFT. The OLED is driven by the driving current I to emit light.

As seen above, the pixel-driving circuit of the present disclosure is able to use a shared data line, without setting any sense line, to perform relevant sensing operations to the driving transistor DTFT and the OLED and to provide compensated data signal to the driving transistor DTFT.

Optionally, both the sensing sub-circuit and the second driving sub-circuit are integrated into a single integrated chip (IC) to reduce the number of chips disposed in the display panel. Optionally, the IC of the sensing sub-circuit and the second driving sub-circuit is part of the source-driving chip. Optionally, the switch can be replaced by a switch-control sub-circuit which is configured to control the connections between either the sensing sub-circuit or the second driving sub-circuit and the data line. Optionally, this switch-control sub-circuit is also integrated into the IC described above. By saving separate layout of extra sensing lines in the display panel, the pixel aperture rate can be effective enhanced.

Figure 8:
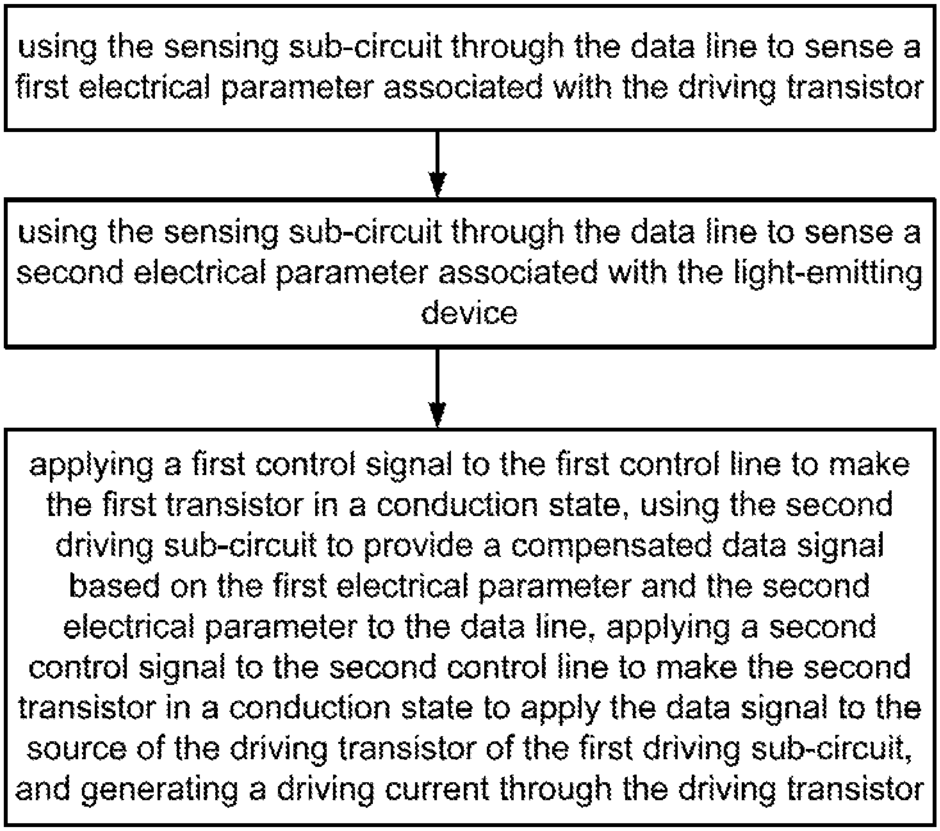
FIG. 8 is a flow chart showing a method of compensating a data signal for driving the pixel-driving circuit according to some embodiments of the present disclosure.

In another aspect, the present disclosure provides a method for compensating a data signal for driving the pixel-driving circuit described herein. FIG. 8 is a flow chart showing a method of providing compensation to a data signal for driving the pixel-driving circuit according to some embodiments of the present disclosure. Referring to FIG. 8, the method is based on the pixel-driving circuit shown in FIG. 1, or FIG. 2, or FIG. 4, or FIG. 6. The method includes a step of using the sensing sub-circuit through the data line to sense a first electrical parameter associated with the driving transistor of the first driving sub-circuit in a transistor-sensing period. When the pixel-driving circuit is operated in the transistor-sensing period, the sensing sub-circuit is sensing a first electrical parameter characterizing the electrical properties of the driving transistor through the data line. In particular, the step includes applying a first control signal from the first control line to turn on the first transistor so that a fixed voltage (from a common voltage line) can be inputted to the control terminal of the driving transistor to make it in a conduction state. The step also includes applying a testing signal from the test input port to the data line. The step also includes applying the second control signal from the second control line to turn on the second transistor so that the testing signal can be inputted from the data line to the second terminal of the driving transistor.

Additionally, the step of operating the sensing sub-circuit in the transistor-sensing period includes turning off the first transistor under a control of the first control signal and cutting off the testing signal from the test input port. This results in a charging from the first power supply to the second terminal of the driving transistor. The sensing sub-circuit is able to sense a voltage value at the second terminal of the driving transistor after being charged for a pre-set time duration.

Referring to FIG. 8, the method further includes a step of using the sensing sub-circuit through the data line to sense a second electrical parameter associated with the light-emitting device in a LED-sensing period. When the pixel-driving circuit is operated in the LED-sensing period, the sensing sub-circuit is sensing a second electrical parameter characterizing the electrical properties of the OLED through the data line. In the embodiment, the step includes controlling the first transistor to a non-conduction state. The step further includes providing the testing signal from the test input port to the data line. The step also includes turning on the second transistor under a control of the second control signal provided from the second control line to allow the testing signal to be inputted to the first terminal of the OLED so that the sensing sub-circuit is able to sense a current flowing through the OLED in the data line.

Referring to FIG. 8, the method includes a step, in the display-driving period, of applying a first control signal to the first control line to make the first transistor in a conduction state to apply the fixed voltage to the control terminal (gate) of the driving transistor. The step also includes using the second driving sub-circuit to provide a compensated data signal based on the first electrical parameter and the second electrical parameter respectively determined in earlier steps to the data line. The step further includes applying a second control signal to the second control line to make the second transistor in a conduction state to apply the compensated data signal to the source of the driving transistor to generate a driving current. The driving current is flowing through the OLED for driving light emission.

Optionally, the step of operating the sensing sub-circuit for sensing the first electrical parameter associated with the driving transistor can be performed ahead of the step of operating the sensing sub-circuit for sensing the second electrical parameter associated with the OLED. Optionally, the step of operating the sensing sub-circuit for sensing the second electrical parameter associated with the OLED is not performed after the step of operating the sensing sub-circuit for sensing the first electrical parameter associated with the driving transistor. In other words, a compensation scheme may be programmed to compensate the drift of the driving transistor only. This method effectively uses a data line as a sense line for the sensing sub-circuit in the transistor-sensing period and/or the LED-sensing period without need of separate sense line, effectively reducing number of conductor lines in the display panel and enhancing the pixel aperture rate.

In another aspect, the present disclosure provides a display panel comprising a plurality of pixel-driving circuits each of which includes a first driving sub-circuit alternately coupled to a sensing sub-circuit and a second driving sub-circuit via a data line controlled by a switch. Each first driving sub-circuit includes a first transistor coupled to an input port being provided with a fixed voltage and a driving transistor having a gate configured to receive the fixed voltage controlled by the first transistor and a drain coupled to a first power supply. The first driving sub-circuit further includes a capacitor coupled between the gate and a source of the driving transistor and a light-emitting device having a first terminal coupled to the source and a second terminal coupled to a second power supply. Additionally, the first driving sub-circuit includes a second transistor having a drain coupled to the source of the driving transistor and a source coupled to the data line. The data line associated with the pixel-driving circuit is connected to the sensing sub-circuit and is disconnected to the second driving sub-circuit in a first period during which the sensing sub-circuit is configured to sense a first electrical parameter associated with the driving transistor and a second electrical parameter associated with the light-emitting device. The same data line is disconnected to the sensing sub-circuit and is connected to the second driving sub-circuit in a second period during which the second driving sub-circuit is configured to generate a compensated data signal based on compensation of a raw data signal using the first electrical parameter and the second electrical parameter and provide the compensated data line to the data line. The compensated data signal is able to be passed to the source of the driving transistor controlled by the second transistor. The first driving sub-circuit is configured to generate a driving current from the drain to the source of the driving transistor based on the compensated data signal provided at the source. The driving current further flows through the light-emitting device to drive light emission.

Optionally, the compensated data signal is at least reduce the drift of electrical properties of the driving transistor in each first driving sub-circuit of the pixel-driving circuit in the display panel during the display-driving period. Optionally, the compensated data signal effectively reduces drifts of electrical properties of both the driving transistor and the light-emitting device in each first driving sub-circuit of the pixel-driving circuit in the display panel during the display-driving period to enhance display uniformity of the whole display panel. Optionally, the light-emitting device in the display panel is an organic light-emitting diode. Optionally, the the sensing sub-circuit and the second driving sub-circuit associated with each pixel-driving circuit are integrated in a single source-driving integrated chip coupled to the data line in the display panel.

In yet another aspect, the present disclosure provides a display apparatus including the display panel described herein. The display apparatus can be one selected from an electric paper, an OLED display panel, a smart phone, a tablet computer, a television, a displayer, a notebook computer, a digital picture frame, a navigator, and any product or component having a display function.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel-driving circuit in a display panel comprising:

a first driving sub-circuit configured to receive a data signal from a data line coupled to a source of a driving transistor for driving a light-emitting device;

a sensing sub-circuit coupled to the data line in a first period; and a second driving sub-circuit coupled to the data line in a second period;

wherein the sensing sub-circuit is configured to sense a first electrical parameter associated with the driving transistor and a second electrical parameter associated with the light-emitting device in the first period; and the second driving sub-circuit is configured to generate a compensated data signal based on compensation of a raw data signal using the first electrical parameter and the second electrical parameter and provide the compensated data signal via the data line to the driving transistor in the second period.

2. The pixel-driving circuit of claim 1, wherein the first driving sub-circuit comprises a first transistor coupled to an input port being provided with a fixed voltage; the driving transistor having a gate configured to receive the fixed voltage controlled by the first transistor and a drain coupled to a first power supply; a capacitor coupled between the gate and a source of the driving transistor; the light-emitting device having a first terminal coupled to the source and a second terminal coupled to a second power supply; and a second transistor having a drain coupled to the source of the driving transistor and a source coupled to the data line.

3. The pixel-driving circuit of claim 2, wherein the fixed voltage is a common voltage signal for each pixel-driving circuit in the display panel.

4. The pixel-driving circuit of claim 1, wherein the sensing sub-circuit and the second driving sub-circuit are integrated into a single source-driving chip in the display panel.

5. The pixel-driving circuit of claim 1, further comprises a switch having a first terminal connected to the data line, a second terminal connected to the sensing sub-circuit, and a third terminal connected to the second driving sub-circuit, the switch being configured to connect the first terminal to the second terminal in the first period and connect the first terminal to the third terminal in the second period.

6. The pixel-driving circuit of claim 2, wherein the first transistor comprises a gate coupled to a first control port, a first terminal coupled to the input port configured to receive the fixed voltage, and a second terminal coupled to the gate of the driving transistor; the second transistor comprises a gate coupled to a second control port, a first terminal coupled to the data line, and a second terminal coupled to the source of the driving transistor.

7. The pixel-driving circuit of claim 1, wherein the light-emitting device comprises an organic light-emitting diode.

8. The pixel-driving circuit of claim 1, wherein the sensing sub-circuit is configured to sense a first electrical parameter associated with the driving transistor in a transistor-sensing period of the first period by sensing a voltage corresponding to a current flowing through the driving transistor, the first electrical parameter including information related to threshold voltage drift and electron mobility drift of the driving transistor.

9. The pixel-driving circuit of claim 1, wherein the sensing sub-circuit is configured to sense a second electrical parameter associated with the light-emitting device in a LED-sensing period of the first period by sensing a current flowing through the light-emitting device, the second electrical parameter including information related to emission efficiency and brightness decay percentage of the light-emitting device.

10. The pixel-driving circuit of claim 8, wherein the transistor-sensing period comprises to a first sub-period during which the data line receives a testing voltage from a test input port and the driving transistor is in conduction state and the sensing sub-circuit senses the testing voltage at the source of the driving transistor, a second sub-period during which the test input port is floated and the data line is connected to the source of the driving transistor which is charged to a sensing voltage induced by the current flowing through the driving transistor over a fixed duration of time and the sensing sub-circuit senses the sensing voltage in the data line for deducing the first electrical parameter, and a third sub-period during which the data line is reset to the testing voltage.

11. The pixel-driving circuit of claim 9, wherein the LED-sensing period comprises a fourth sub-period during which the data line receives a testing voltage from a test input port and the light-emitting device is in conduction state and the sensing sub-circuit senses the current flowing through the light-emitting device in the data line for deducing the second electrical parameter, and a fifth sub-period during which the data line is reset to the testing voltage.

12. The pixel-driving circuit of claim 2, wherein the second driving sub-circuit is part of a source-driving chip configured to receive the raw data signal from a data source and provide the compensated data signal based on a compensation of the raw data signal to the data line and further to the source of the driving transistor through the second transistor to generate a driving current through the light-emitting device in the second period.

13. The pixel-driving circuit of claim 12, wherein the second period comprises a sixth sub-period during which the first transistor and the second transistor are in conduction state, the fixed voltage is applied to the gate of the driving transistor to make it in conduction state, the compensated data signal is applied to the source of the driving transistor, making a gate-to-source potential difference equal to the fixed voltage minus the compensated data signal, and additionally comprises a seventh sub-period during which the first transistor and the second transistor are in non-conduction state, the source of the driving transistor is charged to a voltage provided at the second power supply plus a potential difference induced by the driving current flowing through the light-emitting device.

14. A method for compensating a data signal for driving a pixel-driving circuit, the method comprising:

transmitting a data signal from a data line to a source of a driving transistor of a first driving sub-circuit of the pixel-driving circuit;

coupling a sensing sub-circuit of the pixel-driving circuit to the data line in a first period; and coupling a second driving sub-circuit of the pixel-driving circuit to the data line in a second period;

using the sensing sub-circuit through the data line to sense a first electrical parameter associated with the driving transistor in a transistor-sensing period;

using the sensing sub-circuit through the data line to sense a second electrical parameter associated with a light-emitting device in a LED-sensing period; and in a display-driving period, applying a first control signal to a first control line to make a first transistor of the first driving sub-circuit of the pixel-driving circuit in a conduction state to apply a fixed voltage to a gate of the driving transistor, using a second driving sub-circuit to provide a compensated data signal based on the first electrical parameter and the second electrical parameter via the data line coupled to a source of the driving transistor, applying a second control signal to a second control line to make a second transistor of the first driving sub-circuit of the pixel-driving circuit in a conduction state to apply the compensated data signal to the source of the driving transistor to generate a driving current flowing through the light-emitting device to emit light.

15. The method of claim 14, wherein the using the sensing sub-circuit through the data line to sense a first electrical parameter comprises:

applying the first control signal to the first control line to make the first transistor in a conduction state to apply the fixed voltage to the gate of the driving transistor to make the driving transistor in a conduction state;

applying a testing voltage from a test input port, applying a second control signal to the second control line to make the second transistor in a conduction state to apply the testing voltage to the source of the driving transistor;

turning off the first transistor by the first control signal;

cutting off the testing voltage from the test input port;

charging the source of the driving transistor from a first power supply; and sensing a voltage value in the data line corresponding to a potential level at the source of the driving transistor being charged for a certain duration of time.

16. The method of claim 15, wherein the voltage value in the data line is processed in an external IC chip to deduce the first electrical parameter associated with the driving transistor including information related to threshold voltage drift and electron mobility drift of the driving transistor, the first electrical parameter being used for generating the compensated data signal.

17. The method of claim 14, wherein the using the sensing sub-circuit through the data line to sense a second electrical parameter comprises:

turning off the first transistor by the first control signal;

applying a testing voltage to the data line;

applying the second control signal to the second control line to control the second transistor in a conduction state to apply the testing voltage to a first terminal of the light-emitting device; and sensing a current value in the data line flowing through the light-emitting device.

18. The method of claim 17, wherein the current value is processed by an external IC chip to deduce the second electrical parameter associated with the light-emitting device including information related to emission efficiency and brightness decay percentage of the light-emitting device, the second electrical parameter being used for generating the compensated data signal.

19. A display panel comprising a plurality of pixel-driving circuits of claim 1, each of the plurality of pixel-driving circuits includes a first driving sub-circuit alternately coupled to a sensing sub-circuit and a second driving sub-circuit via a data line controlled by a switch, each first driving sub-circuit comprising:

a first transistor coupled to an input port being provided with a fixed voltage;

a driving transistor having a gate configured to receive the fixed voltage controlled by the first transistor and a drain coupled to a first power supply;

a capacitor coupled between the gate and a source of the driving transistor;

a light-emitting device having a first terminal coupled to the source and a second terminal coupled to a second power supply; and a second transistor having a drain coupled to the source of the driving transistor and a source coupled to the data line;

wherein the data line is connected to the sensing sub-circuit and is disconnected to the second driving sub-circuit in a first period during which the sensing sub-circuit is configured to sense a first electrical parameter associated with the driving transistor and a second electrical parameter associated with the light-emitting device;

wherein the data line is disconnected to the sensing sub-circuit and is connected to the second driving sub-circuit in a second period during which the second driving sub-circuit is configured to generate a compensated data signal based on compensation of a raw data signal using the first electrical parameter and the second electrical parameter and provide the compensated data signal to the data line, the compensated data signal being able to be applied to the source of the driving transistor controlled by the second transistor.

20. A display apparatus comprising the display panel of claim 19, wherein the light-emitting device is an organic light-emitting diode, and the sensing sub-circuit and the second driving sub-circuit associated with each pixel-driving circuit are integrated in a single source-driving chip coupled to the data line in the display panel.

* * * * *